US006169049B1

(12) United States Patent
Witham et al.

(10) Patent No.: US 6,169,049 B1
(45) Date of Patent: Jan. 2, 2001

(54) SOLUTION COATED HYDROTHERMAL BATIO₃ FOR LOW-TEMPERATURE FIRING

(76) Inventors: John P. Witham, 16350 S. Harbor Blvd., Apt. #2305, Fountain Valley, CA (US) 92704; Clive A. Randall, 125 N. Hills Plaza, State College, PA (US) 16801; Umesh Kumar, 578 Circle Dr., Surfside Beach, SC (US) 29575-5115; Ulagaraj Selvaraj, 1904 Loganwood Dr., Apex, NC (US) 27502; Sea-Fue Wang, 42 Greenknoll Dr., Brookfield, CT (US) 06804; Joseph P. Dougherty, 524 E. Irvin Ave., State College, PA (US) 16801

( * ) Notice: Under 35 U.S.C. 154(b), the term of this patent shall be extended for 0 days.

(21) Appl. No.: 08/847,613

(22) Filed: Apr. 28, 1997

(Under 37 CFR 1.47)

(51) Int. Cl.⁷ .................................................. C04B 35/468
(52) U.S. Cl. .............................................. 501/137; 501/139
(58) Field of Search ...................................... 501/137, 139

Primary Examiner—Deborah Jones
(74) Attorney, Agent, or Firm—Thomas J. Monahan (57) ABSTRACT

Hydrothermal $BaTiO_3$ crystallites were coated with Bismuth solutions prepared from Bismuth metal-organics and anhydrous solvents. The Bismuth metal-organics were Bi 2-ethylhexanoate and Bi-neodecanoate. Bismuth oxide was also used as a comparison to the Bismuth solutions. $BaTiO_3$ ceramics with either 3.0 wt % equivalent Bismuth oxide or 5.0 wt % equivalent Bismuth oxide were made by sintering the compacts between 700° C. and 1000° C. $BaTiO_3$ ceramics that were coated by Bi-neodecanoate densified >90% theoretical as low as 800° C. for 3.0 wt % equivalent $Bi_2O_3$. Average grain sizes of 0.2–0.4 μm were observed for Bi-coated $BaTiO_3$ ceramics, for sintering temperatures below 950° C. Dielectric K versus temperature measurements of Bismuth-coated $BaTiO_3$ ceramics, sintered in the lower temperature ranges, showed consistently superior dielectric characteristics.

11 Claims, 6 Drawing Sheets

SOLUTION COATED HYDROTHERMAL BATIO₃ FOR LOW-TEMPERATURE FIRING

FIELD OF THE INVENTION

This invention relates to an improved barium titanate based dielectric composition and, more particularly, to a barium titanate composition wherein barium titanate crystallites are coated with a Bismuth metal-organic to achieve both a low-firing temperature and improved dielectric properties.

BACKGROUND OF THE INVENTION

Barium titanate ($BaTiO_3$) based compositions are commercially used as capacitor dielectrics, particularly for multilayer ceramic (MLC) capacitors. Present manufacturing techniques produce MLCs with thickness layers of 5–10 µm. Yet, with decreasing operating voltages of MLCs, thickness layers are expected to be less than 5 µm. In order to achieve these thickness layers and produce reliable MLCs, average grain size of the sintered $BaTiO_3$ ceramics need to be one-tenth the size of the layer thickness (i.e., ~0.5 µm).

In addition to producing thinner layers for MLCs, manufacturers are actively pursuing methods for lowering the cost of MLCs. In particular, electrode materials make up a significant portion of the production costs for MLCs. Palladium-silver electrodes (e.g., 70/30 Pd-Ag) are substantially lower in price compared to platinum and pure palladium electrodes. Yet, in order to utilize Pd/Ag electrode materials, $BaTiO_3$-based dielectric materials must be sintered at or below 1100° C.

In order to prepare $BaTiO_3$-based ceramics that can be sintered below 1100° C. and have high densities with average grain sizes of 0.5 µm or less, a combination of hydrothermally-prepared powders with primary crystallites in the nanometer-sized range and a fluxing agent or a low-melting glass powder to promote densification of $BaTiO_3$ by liquid phase sintering below 1100° C. is needed. Fluxing agents and low-melting glass powders have been used to densify $BaTiO_3$ at lower sintering temperatures. Fluxing agents that have been used for flux-sintering $BaTiO_3$ include lithium fluoride, boron oxide, copper oxide, lead germanate, cadmium silicate, and mixtures of cadmium oxide and Bismuth oxide. Also, low-melting glass compounds, such as borosilicate glass powders that contain significant amounts of PbO, BaO, $Bi_2O_3$, CdO, and ZnO modifiers, have been used to promote densification of $BaTiO_3$ at lower sintering temperatures.

Kumar et al. describe a low-firing $BaTiO_3$ that is sintered from hydrothermal $BaTiO_3$ mixed with 3–5 wt % $Bi_2O_3$. (See: Kumar et al., "Preparation of Dense Ultra-Fine Grain Barium Titanate-Based Ceramics", International Society of Applied Ferroelectrics (ISAF) Conference Proceedings, pp 70–73, 1992). Kumar et al. report that $BaTiO_3$ ceramics can be sintered to high densities as low as 850° C. using this process. On the other hand, Burn ("Flux-Sintered $BaTiO_3$ Dielectrics", *Journal of Materials Science*, 17, 1398–1408, 1982) indicates that commercially available $BaTiO_3$ can be sintered to high densities only around 1100° C. using the fluxing agents mentioned above. Average grain size of the low-firing $BaTiO_3$ ceramics prepared by Kumar et al. were in the range of 0.15–0.20 µm.

Kumar et al. also did preliminary work on using a Bismuth-based solution to coat hydrothermal $BaTiO_3$ crystallites so as to form a low-firing $BaTiO_3$ material. (See: Kumar et al., "Densification and Dielectric Properties of Hydrothermal $BaTiO_3$ with Different $Bi_2O_3$ Sources", *Ferroelectrics*, Vol. 154, 283–288, 1994). Bismuth oxide powder was also mixed with the hydrothermal $BaTiO_3$ crystallites, and the sintering results from the conventionally mixed batch was compared with the two solution-coated batches. $BaTiO_3$ ceramics with 3.0 wt % equivalent $Bi_2O_3$ addition could be sintered to >90% theoretical density as low as 800° C. for the two solution-coated batches. Yet, even though sintering results for solution-coated batches looked promising, the two solution-coated $BaTiO_3$ powders did not show consistent densification results with each other. No details were given regarding the composition of the Bismuth-based solutions Accordingly, it is an object of this invention to provide an improved $BaTiO_3$ ceramic that can be fired at a relatively low firing temperature.

It is a further object of this invention to provide an improved $BaTiO_3$ ceramic that exhibits consistent densification results.

It is another object of this invention to provide an improved $BaTiO_3$ ceramic that exhibits improved dielectric properties, even when fired at a low temperature.

SUMMARY OF THE INVENTION

Hydrothermal $BaTiO_3$ crystallites were coated with Bismuth solutions prepared from Bismuth metal-organics and anhydrous solvents. The Bismuth metal-organics were Bi 2-ethylhexanoate and Bi-neodecanoate. Bismuth oxide was also used as a comparison to the Bismuth solutions. $BaTiO_3$ ceramics with either 3.0 wt % equivalent Bismuth oxide or 5.0 wt % equivalent Bismuth oxide were made by sintering the compacts between 700° C. and 1000° C. $BaTiO_3$ ceramics that were coated by Bi-neodecanoate densified >90% theoretical as low as 800° C. for 3.0 wt % equivalent $Bi_2O_3$. Average grain sizes of 0.2–0.4 µm were observed for Bi-coated $BaTiO_3$ ceramics. Dielectric K versus temperature measurements of Bismuth-coated $BaTiO_3$ ceramics, sintered in the lower temperature ranges, showed consistently superior dielectric characteristics.

DETAILED DESCRIPTION OF THE INVENTION

Two types of Bismuth metal-organics, Bi 2-ethylhexanoate (Strem Chemicals and Johnson Matthey) and Bi-neodecanoate (Strem Chemicals) were investigated as coatings for hydrothermal $BaTiO_3$ crystallites. Such crystallites exhibit diameters in the range of 0.1 µm to 0.2 µm. By contrast, $Bi_2O_3$ crystallites exhibit diameters in the range of 1.0µ. Since it is desired that the end result of the process be hydrothermal $BaTiO_3$ crystallites with nanometer-thickness coating of a Bi-containing compound, it was realized that such a result could not be achieved through use of $Bi_2O_3$ crystallites.

The goals for coating hydrothermal $BaTiO_3$ powders were to (i) minimize the final amount of $Bi_2O_3$ in the densified $BaTiO_3$ ceramics, (ii) minimize the grain size, and (iii) lower the overall sintering temperatures for the Bismuth-coated $BaTiO_3$ ceramics. Three different sources of commercially available hydrothermal $BaTiO_3$ powders were sintered with and without the Bismuth coatings in order to determine if certain powder characteristics (e.g., crystallite size, surface area, Ba/Ti stoichiometry, etc.) in conjunction with the Bismuth coatings enhanced the densification of the hydrothermal $BaTiO_3$ powders.

$BaTiO_3$ ceramics with either 3.0 wt % equivalent Bismuth oxide or 5.0 wt % equivalent Bismuth oxide were made by sintering the compacts between 700° C. and 1000° C. $BaTiO_3$ ceramics that were coated by Bi-neodecanoate densified >90% theoretical as low as 800° C. for 3.0 wt % equivalent $Bi_2O_3$. Average grain sizes of 0.2–0.4 µm were observed for Bi-coated $BaTiO_3$ ceramics. Dielectric K versus temperature measurements of Bismuth-coated $BaTiO_3$ ceramics, sintered in the lower temperature ranges, showed consistently superior dielectric characteristics.

EXPERIMENTAL PROCEDURE

Three hydrothermal $BaTiO_3$ powders were used in the investigation: Cabot BT-10 (i.e. surface area of 10 $m^2/g$), Cabot BT-6 (i.e., 6 $m^2/g$), and Sakai BT-01 (i.e., crystallite size of 0.1 µm). Bismuth-containing chemicals used to coat the hydrothermal $BaTiO_3$ powders were Bismuth 2-ethylhexanoate (Strem Chemicals), Bi 2-ethylhexanoate (Johnson Matthey), and Bi-neodecanoate (Strem Chemicals). Bismuth oxide ($Bi_2O_3$, Aldrich Chemicals) was used as a comparison to the Bismuth metal organic compounds, since the objective was to determine if the Bismuth precursors were more effective in coating the hydrothermal $BaTiO_3$ crystallites than the $Bi_2O_3$ particles.

Sources for the various $BaTiO_3$ powders and Bismuth compounds were as follows:

| Designation | Company | Company Address |
|---|---|---|
| $BaTiO_3$ Powders | | |
| Cabot BT-10 | Cabot Performance Materials | P.O. Box 1608 County Line Road Boyertown, PA 19512 |
| Cabot BT-8 | Cabot Performance Materials | Boyertown, PA 19512 |
| Cabot BT-6 | Cabot Performance Materials | P.O. Box 1608 County Line Road Boyertown, PA 19512 |
| Sakai BT-01 | Sakai Chemical Industry Company, Ltd. | 5-1 Ebisujima-cho, Sakai Osaka 590, Japan |
| Bismuth Compounds | | |
| Bi-2ethylhexanoate | Strem Chemicals | 7 Mulliken Way Dexter Industrial Park Newburyport, MA 01950-4098 |
| Bi-neodecanoate | Strem Chemicals | 7 Mulliken Way Dexter Industrial Park Newburyport, MA 0194098 |
| Bi-2ethylhexanoate | Alfa Aesar | 30 Bond Street Ward Hill, MA 01835 |
| Bismuth oxide | Aldrich Chemical Co., Inc. | 1001 West St. Paul Avenue Milwaukee, WI 53233 |
| Bi metal carboxylates | OM Group, Inc. Kokkola Chemicals Mooney Chemicals, Inc. Vasset S.A. | 2301 Scranton Road Cleveland, OH 44113 |
| Bi metal carboxylates Bi alkoxides Bi alkoxide-carboxylates | Chemet Technology | 19365 Business Center Drive Northridge, CA 91324 |

Anhydrous solvents used to disperse the Bi-containing chemicals were 1-Butanol, 1-Propanol, and Ethanol. A summary of the various experimental parameters is given in Table I below.

TABLE I

| Composition | Amount of $Bi_2O_3$ Addition | Bismuth Source | Solvent |
|---|---|---|---|
| Cabot BT-10B (Batch 15) | 5.0 | Bi 2-ethylhexanoate (Strem) | 1-Butanol |
| Cabot BT-6 (Batch 10) | 5.0 | Bi 2-ethylhexanoate (Strem) | Ethanol |
| Sakai BT-01 (Batch 22) | 5.0 | Bi 2-ethylhexanoate (Strem) | 1-Butanol |
| Cabot BT-10B (Batch 14) | 3.0 | Bi 2-ethylhexanoate (Strem) | 1-Butanol |
| Cabot BT-10B (Batch 25) | 3.0 | Bi-neodecanoate (Strem) | 1-Butanol |
| Cabot BT-10B (Batch 33) | 3.0 | $Bi_2O_3$ (Aldrich) | None |
| Cabot BT-10 (Batch 34) | 5.0 | $Bi_2O_3$ (Aldrich) | None |
| Cabot BT-10B (Batch 26) | 5.0 | Bi-neodecanoate (Strem) | 1-Butanol |

Figure 1:
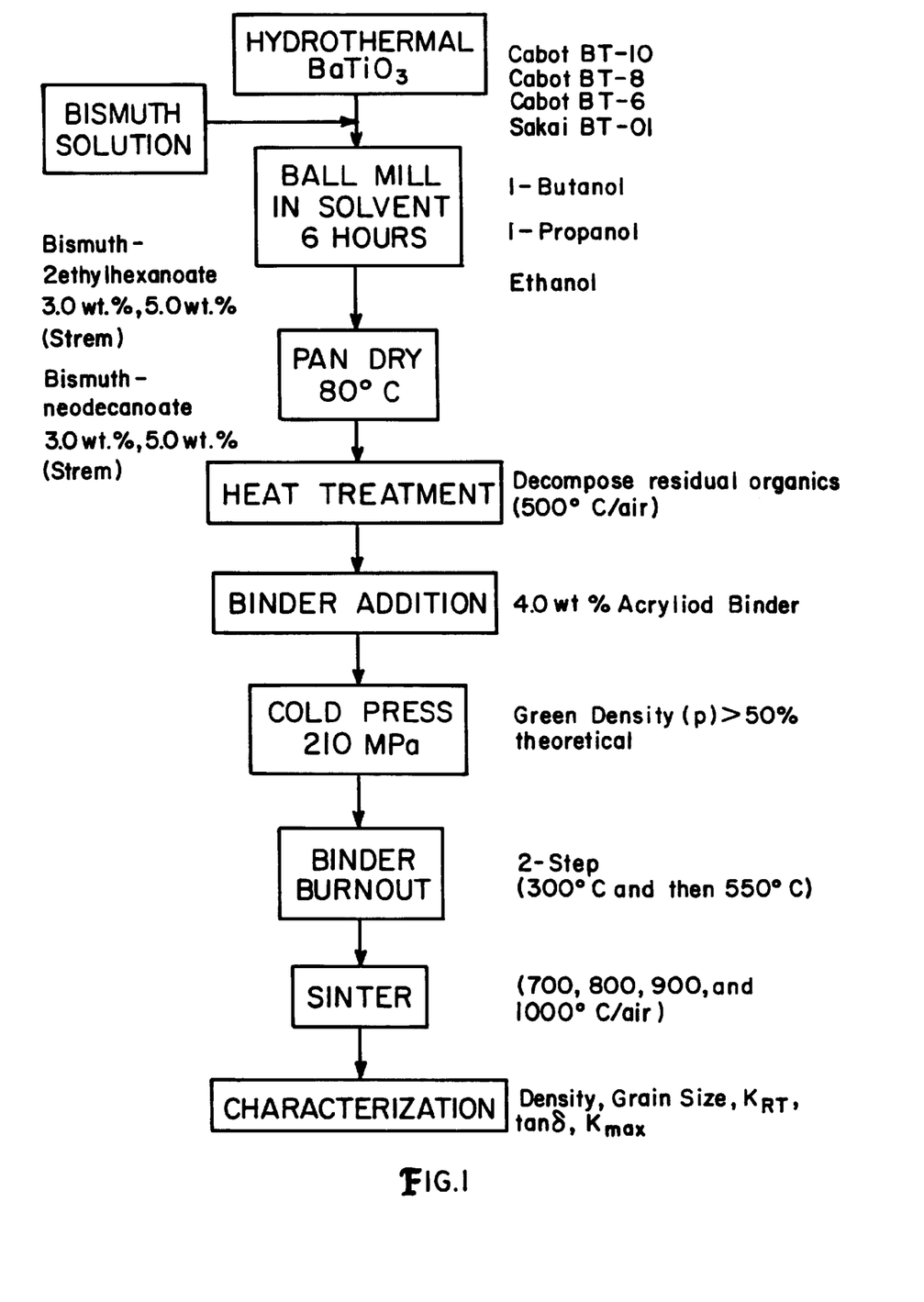
FIG. 1 is a diagram which illustrates the process by which the improved $BaTiO_3$ ceramics were produced.
Figure 2:
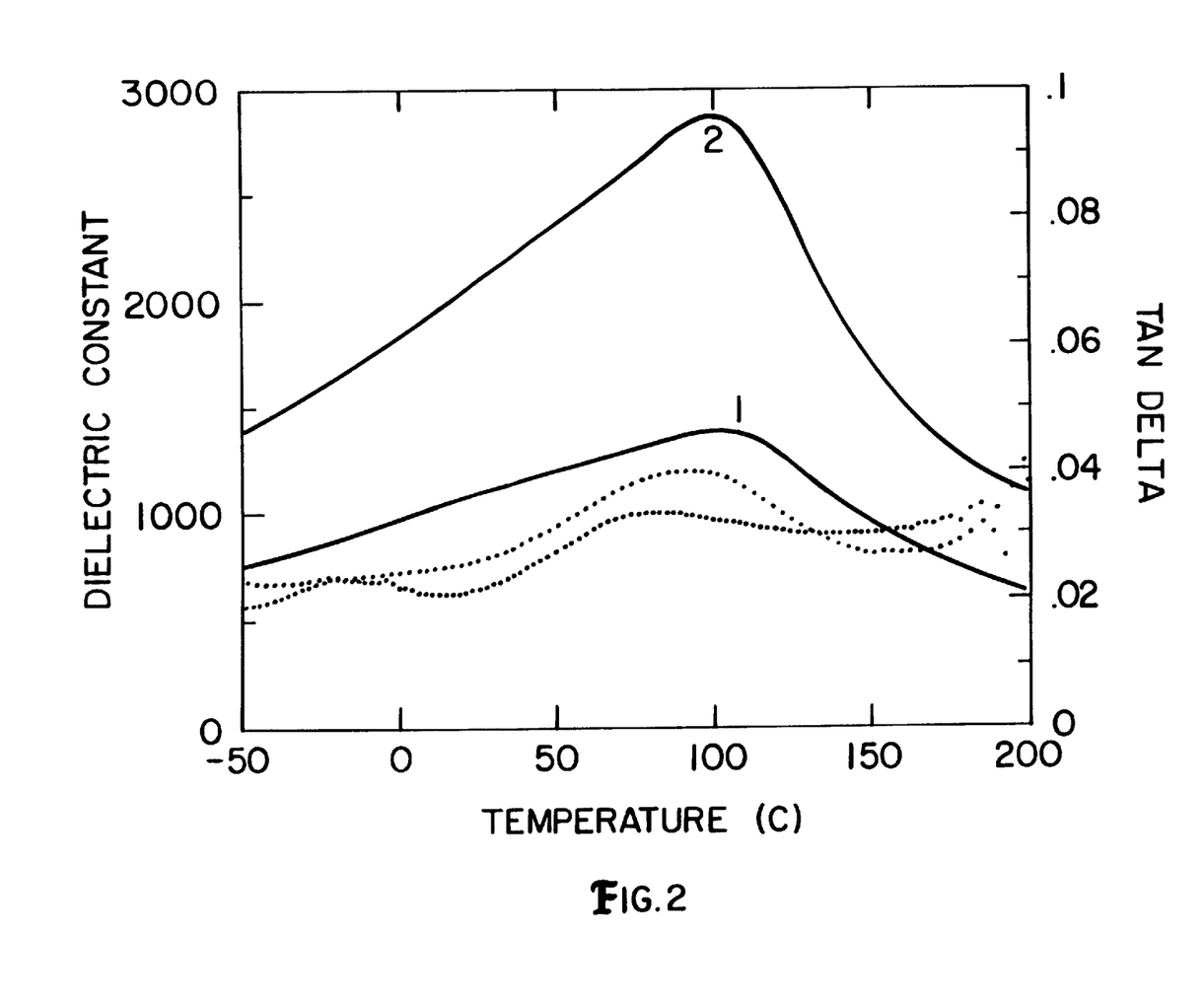
FIG. 2 is a plot of dielectric K and tan δ versus temperature for Bi-coated (3.0 wt % $Bi_2O_3$) $BaTiO_3$ ceramics sintered to 800° C., wherein the Bismuth precursors were: (1) Bi 2-ethylhexanoate (Johnson Matthey Batch 23) and (2) Bi-neodecanoate (Strem, Batch 25). Also, dielectric K and tan δ curves for all figures are plotted at 1.0 kHz frequency.
Figure 3:
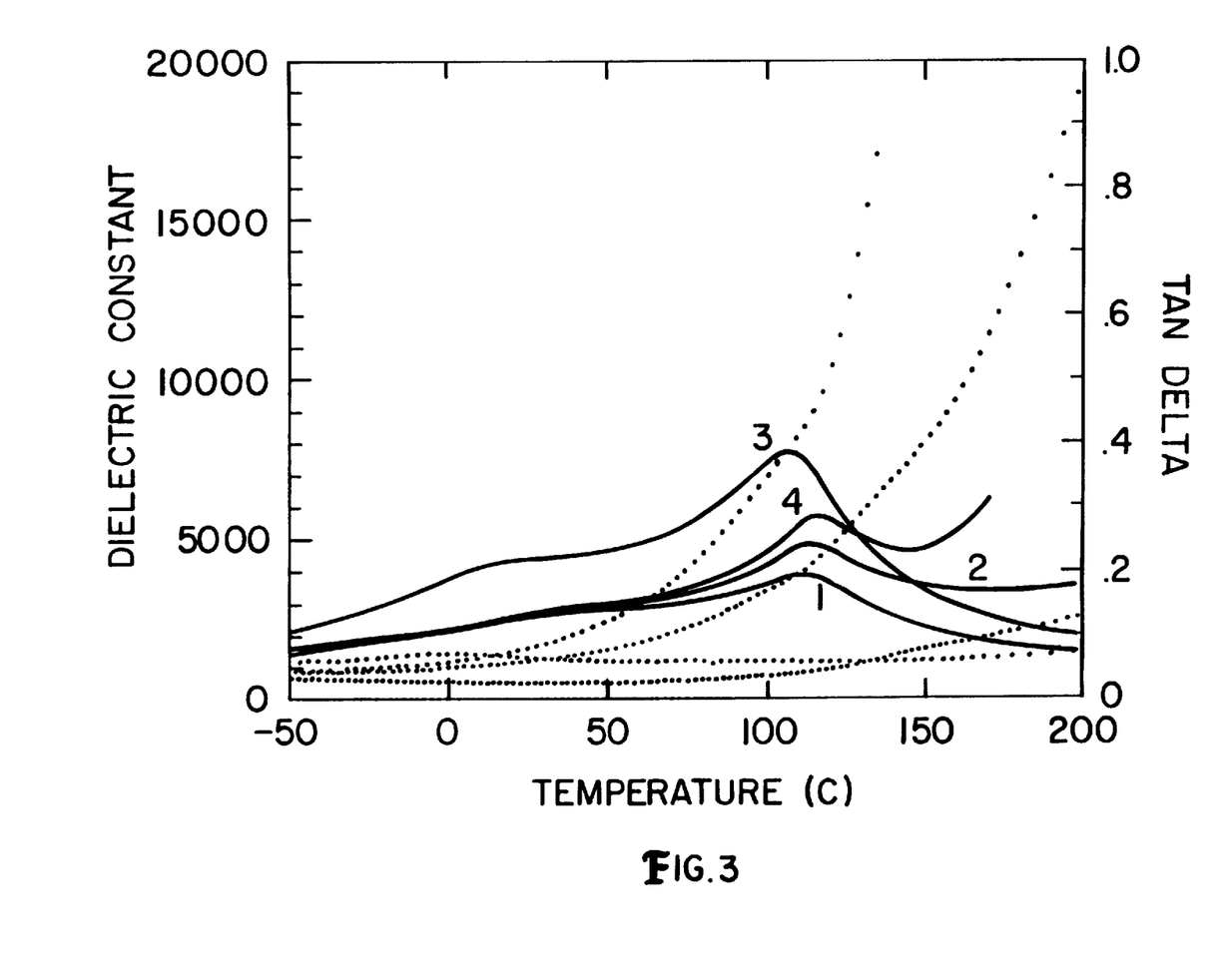
FIG. 3 is a plot of dielectric K and tan δ versus temperature for Bi-coated (3.0 wt % $Bi_2O_3$) $BaTiO_3$ ceramics sintered to 900° C., wherein the Bismuth precursors were: (1) Bi 2-ethylhexanoate (Strem, Batch 14); (2) Bi 2-ethylhexanoate (Johnson Matthey, Batch 23); (3) Bi-neodecanoate (Strem, Batch 25) and (4) $Bi_2O_3$ (Aldrich, Batch 33).
Figure 4:
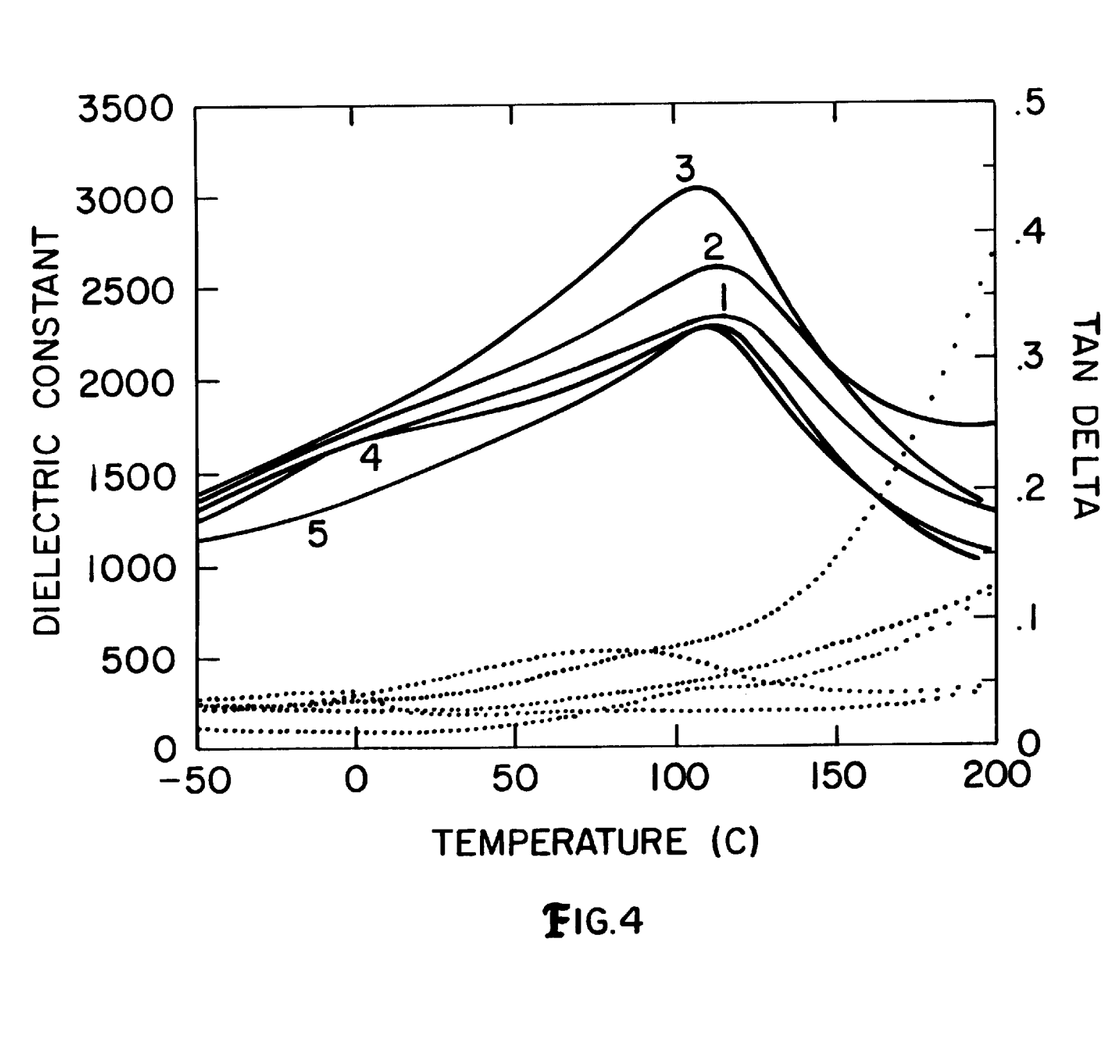
FIG. 4 is a plot of dielectric K and tan δ versus temperature for Bi-coated (5 wt % $Bi_2O_3$) $BaTiO_3$ ceramics sintered to 800° C., wherein the Bismuth precursors were: (1) Bi 2-ethylhexanoate (Strem Batch 15); (2) Bi 2-ethylhexanoate (Johnson Matthey, Batch 24); (3) Bi-neodecanoate (Strem, Batch 26); (4) $Bi_2O_3$ (Aldrich, Batch 34); and (5) Bi 2-ethylhexanoate (Strem, Batch 47). Note that for Batch 47, $BaTiO_3$ source is Cabot BT-8, instead of Cabot BT-10.
Figure 5:
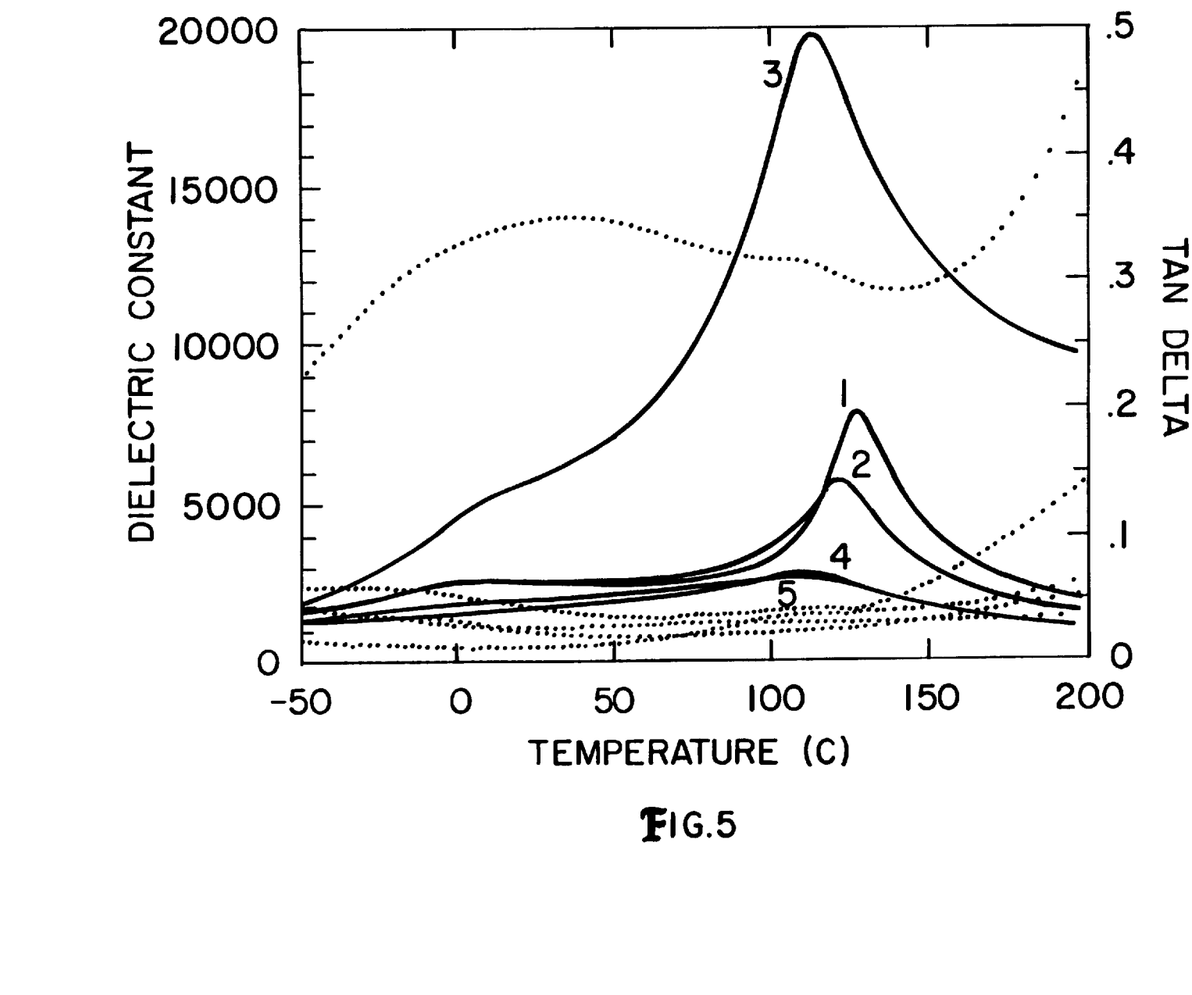
FIG. 5 is a plot of dielectric K and tan δ versus temperature for Bi-coated (5 wt % $Bi_2O_3$) $BaTiO_3$ ceramics sintered to 900° C., wherein the Bismuth precursors were: (1) Bi 2-ethylhexanoate (Strem, Batch 15); (2) Bi 2-ethylhexanoate (Johnson Matthey, Batch 24); (3) Bi-neodecanoate (Strem, Batch 26) and (4) $Bi_2O_3$ (Aldrich, Batch 34); and (5) Bi 2-ethylhexanoate (Strem, Batch 47). Note that for Batch 47, $BaTiO_3$ source is Cabot BT-8, instead of Cabot BT-10.
Figure 6:
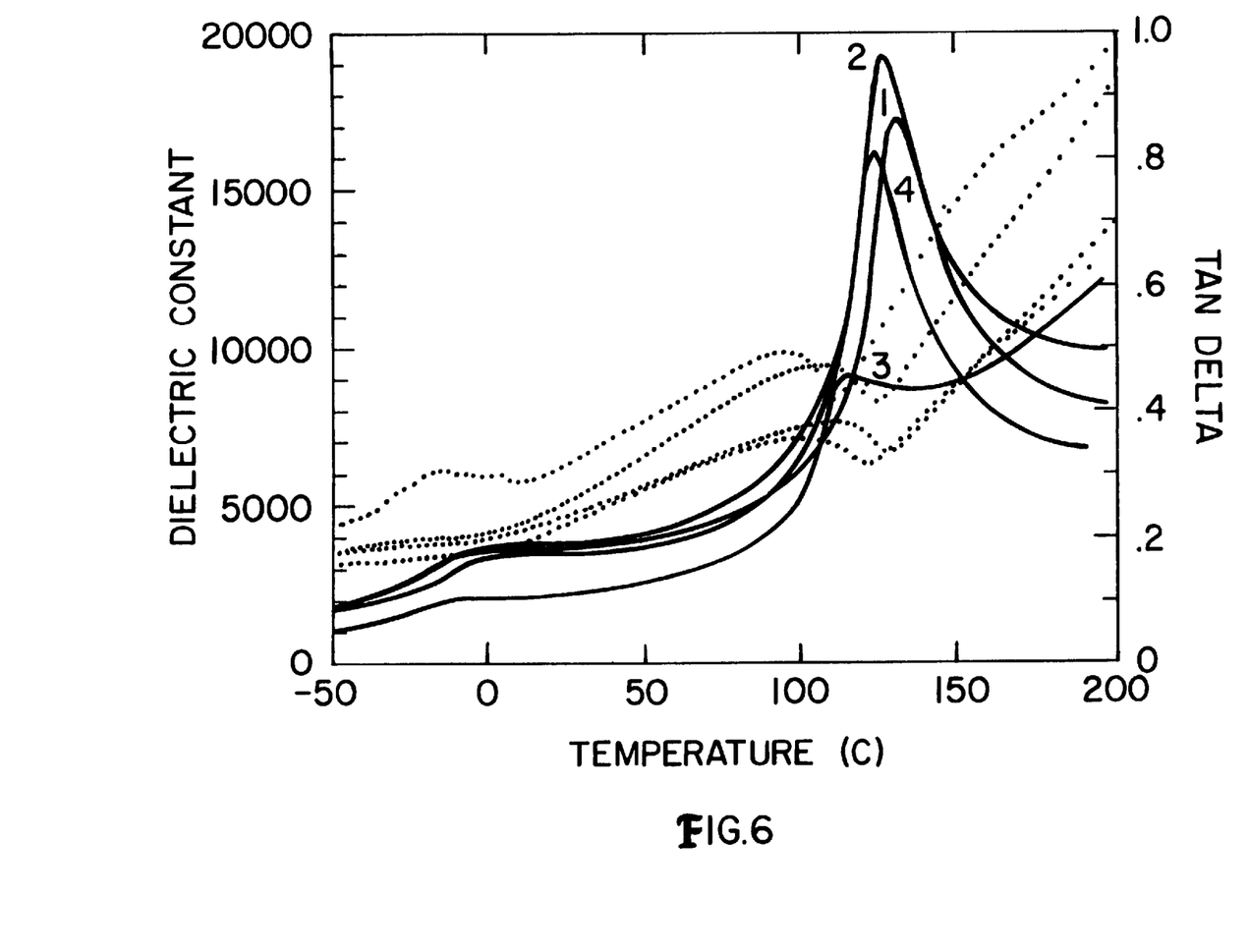
FIG. 6 is a plot of dielectric K and tan δ versus temperature for Bi-coated (5 wt % $Bi_2O_3$) $BaTiO_3$ ceramics sintered to 1000° C., wherein the Bismuth precursors were: (1) Bi 2-ethylhexanoate (Strem, Batch 15); (2) Bi 2-ethylhexanoate (Johnson Matthey, Batch 24); (3) Bi-neodecanoate (Strem, Batch 26) and (4) $Bi_2O_3$ (Aldrich, Batch 34).

FIG. 1 shows the procedure used for coating and densification of hydrothermal $BaTiO_3$ powders (box 10) in accordance with the invention. The amount of the Bismuth metal-organic materials was varied, using either 3.0 wt % or 5.0 wt % equivalent $Bi_2O_3$ additions to $BaTiO_3$ powders. The Bismuth-containing solutions (box 12) were prepared in a glovebox by mixing the Bismuth metal-organic with an anhydrous solvent in an argon atmosphere.

The Bismuth-containing solutions were added to hydrothermal $BaTiO_3$ powders and were mixed for six hours (box 14). After drying off the solvent (box 16), the residual organics in the Bismuth-coated hydrothermal $BaTiO_3$ powders were decomposed in air at 500° C. for six hours (box 18). The heat-treated powders were mixed with an acryloid resin binder (box 20) (Rohm and Haas), and then uniaxially pressed at 210 MPa in a Carver press to form green ceramic disks (box 22). The acryloid binder was removed from the samples by a 2-step heating profile, first at 300° C. for 3 hours and then at 550° C. for 5 hours (box 24). Samples were then sintered in closed alumina ($Al_2O_3$) crucibles for two hours with temperatures ranging from 700° C. to 1000° C. (box 26).

Uncoated and Bismuth-coated $BaTiO_3$ powders were analyzed (box 28) for surface area (BET) by a Quantachrome Monosorb BET unit. Weight loss and decomposition of the residual organics in the coated $BaTiO_3$ powders were analyzed by a Perkin-Elmer Thermogravimetric Analyzer (TGA-7) and a Perkin-Elmer Differential Thermal Analyzer DTA 1700, respectively. Phase analysis of the uncoated and Bismuth-coated $BaTiO_3$ powders was conducted on a Scintag DMC-105 x-ray diffractometer. Bulk densities of sintered $BaTiO_3$ samples were measured at room temperature by Archimedes principle by immersing the samples in Xylene.

Microstructures of the sintered samples were observed on fracture surfaces of the samples with an ISI-SKI 130 scanning electron microscope (SEM, Akashi Beam Technology Corporation). Dielectric properties of ceramic disk samples with sputtered gold electrodes were measured on a computer controlled setup consisting of a Hewlett Packard 4274A LCR Bridge and a Delta Design temperature chamber. Measurements were taken on the samples on cooling from 200° C. to −50° C. over a frequency range of 100 to 10,000 Hz, at a cooling rate of 1.0° C./min.

RESULTS

A. Densification and Properties of Hydrothermal $BaTiO_3$ Powders

Characteristics of the as-received Cabot BT-10, Cabot BT-6, and Sakai BT-01 hydrothermal $BaTiO_3$ are presented in Table II below.

TABLE II

Characteristics of Uncoated Hydrothermal $BaTiO_3$ Powders

| $BaTiO_3$ Composition | Spectrorochemical Analysis Ba:Ti Ratio | Surface Area (BET) ($m^2/g$) | Crystallite Size (BET) (nm) |
|---|---|---|---|
| Cabot BT-10B | 1.01 | 10.05 (room temp.) | 99.2 |
| | | 8.22 (800° C.) | 121.3 |
| Cabot BT-8 | 1.006 | 8.64 (room temp.) | 115.4 |

TABLE II-continued

Characteristics of Uncoated Hydrothermal $BaTiO_3$ Powders

| $BaTiO_3$ Composition | Spectrorochemical Analysis Ba:Ti Ratio | Surface Area (BET) ($m^2/g$) | Crystallite Size (BET) (nm) |
|---|---|---|---|
| Cabot BT-6 | 0.99 | 7.39 (room temp.) | 134.9 |
| | | 5.39 (800° C.) | 184.9 |
| Sakai BT-01 | 1.00 | 14.25 (room temp.) | 69.9 |
| | | 8.79 (800° C.) | 113.4 |

(1) Crystallite size is calculated from the following equation:
PD = 6(p*SA)
where PD = crystallite size (nm)
p = theoretical density (6.02 g/cc for $BaTiO_3$)
SA = surface area ($m^2/g$).
Assumption - have spherical crystallites The $BaTiO_3$ powders still exhibited a significant surface area after heat treatment at 800° C., ranging from 5.40 $m^2/g$ for Cabot BT-6 to 8.80 $m^2/g$ for Sakai BT-01, which indicates that these heat-treated powders still had fine crystallite sizes ($10^2$~$10^3$ nm).

Chemical analysis of the hydrothermal $BaTiO_3$ powders showed the Cabot BT-10 powder to have had a slight excess of Barium (0.002–0.010 moles). This excess Barium in Cabot BT-10 composition is important when analyzing the sintering results of the various hydrothermal $BaTiO_3$ powders.

Densification of Cabot BT-10 was >96% theoretical density at 1100° C. for a 2-hour soak time, which is 100° C. lower than that for Sakai BT-01 and 200° C. lower than that for Cabot BT-6 (see Table III below). A fine grain-size microstructure was observed for $BaTiO_3$ ceramics of Cabot BT-10 composition that are sintered at 1100° C.; however, large grains (>5.0 μm) were observed in the $BaTiO_3$ ceramics of this composition when sintered above 1200° C.

Results of densification and dielectric properties of ceramics that were sintered from Bismuth-coated (5.0 wt % equivalent $Bi_2O_3$) Cabot BT-10, Cabot BT-6, and Sakai BT-01 powders are shown in Table IV below. The Bismuth metal organic used to coat these hydrothermal $BaTiO_3$ powders is a Bismuth 2-ethylhexanoate from Strem Chemicals. Ceramics of Bismuth-coated Cabot BT-10 composition densified as low as 800° C., compared to 900° C. for Bismuth-coated Cabot BT-6 and >1000° C. for Bismuth-coated Sakai BT-01 samples. The reason for Bismuth-coated Cabot BT-10 hydrothermal powder densifying at a lower temperature than the other hydrothermal $BaTiO_3$ powders was the probable formation of a liquid phase due to combination of $Bi_2O_3$ flux and the Barium-rich surface layer of hydrothermal $BaTiO_3$ powder.

When this liquid phase does occur during sintering, it is likely to cause a glassy grain boundary phase that surrounds the pure $BaTiO_3$ grains, which is typical for core-shell microstructures that are observed in $BaTiO_3$-based dielectric compositions. Indirect evidence of the formation of this Bismuth-containing glassy phase was illustrated by limited grain growth for Bismuth-coated $BaTiO_3$ ceramics of Cabot BT-10 composition below 1000° C. and

TABLE III

Density and Dielectric Properties of Uncoated BaTiO₃ Sintered at Different Temperatures

| BaTiO$_3$ Composition | Sintering Temp. (° C.) | Bulk Density (g/cm$^3$) | % Theoretical Density | Grain Size ($\mu$m) | Weight Change (%) | Dielectric $K_{RT}$ (1.0 kHz) | tan$\delta_{RT}$ (1.0 kHz) | $K_{max}$ (1.0 kHz) | $T_{max}$ (° C.) |
|---|---|---|---|---|---|---|---|---|---|
| Cabot BT-10B | 1000 | 4.74 | 78.7 | — | −0.9 | — | — | — | — |
|  | 1100 | 5.81 | 96.5 | 0.5–5.0 | −1.1 | 3055 | 0.027 | 6235 | 121 |
|  | 1200 | 5.87 | 97.5 | 4.0–8.0 | −1.2 | 2695 | 0.023 | 8960 | 121 |
|  | 1300 | 5.87 | 97.5 | 5.0–20.0 | −1.3 | 2295 | 0.025 | 9250 | 123 |
| Cabot BT-8 | 1100 | 5.23 | 86.9 | — | −0.69 | 4950 | 0.064 | — | — |
|  | 1200 | 5.78 | 96.0 | — | −0.69 | 5340 | 0.015 | 10,005 | 125 |
|  | 1300 | 5.84 | 97.0 | — | −0.75 | 3825 | 0.010 | 10,340 | 127 |
| Cabot BT-6 | 1100 | 3.97 | 69.7 | — | −0.4 | — | — | — | — |
|  | 1200 | 5.11 | 84.9 | 0.5–1.0 | −0.5 | 4085 | 0.012 | 5980 | 122 |
|  | 1300 | 5.92 | 98.3 | — | −0.5 | 3760 | 0.006 | 9470 | 126 |
|  | 1400 | 5.85 | 97.2 | 10.0-40.0 | −1.2 | 1980 | 0.016 | 12,820 | 127 |
| Sakai BT-01 | 1000 | 3.83 | 63.6 | 0.49 | −0.9 | 1775 | 0.015 | 2820 | 123 |
|  | 1100 | 4.49 | 74.6 | 0.77 | −0.9 | 3180 | 0.019 | 5580 | 123 |
|  | 1200 | 5.92 | 98.3 | — | −1.0 | — | — | — | — |
|  | 1300 | 5.93 | 98.5 | — | −1.0 | 2725 | 0.035 | 13,530 | 128 |

TABLE IV

Density and Dielectric Properties of Various Solution-Coated BaTiO₃ Compositions (+5.0 wt % Bi₂O₃) Sintered at Different Temperatures

| BaTiO$_3$ Composition | Sintering Temp. (° C.) | Bulk Density (g/cm$^3$) | % Theoretical Density | Grain Size ($\mu$m) | Weight Change (%) | Dielectric $K_{RT}$ (1.0 kHz) | tan$\delta_{RT}$ (1.0 kHz) | $K_{max}$ (1.0 kHz) | $T_{max}$ (° C.) |
|---|---|---|---|---|---|---|---|---|---|
| Cabot BT-10B | 700 | 5.19 | 84.3 | 0.23 | −0.26 | 1200 | 0.029 | 1450 | 98 |
|  | 800 | 5.72 | 92.9 | 0.24 | −0.45 | 1805 | 0.030 | 2330 | 113 |
|  | 900 | 5.93 | 96.3 | 0.39 | −0.50 | 2575 | 0.044 | 7910 | 127 |
|  | 1000 | 5.82 | 94.5 | 3.44 | −0.52 | 3650 | 0.234 | 17,345 | 129 |
| Cabot BT-8 | 800 | 5.61 | 91.1 | 0.21 | −0.65 | 1535 | 0.013 | 2270 | 109 |
|  | 900 | 5.69 | 92.4 | 0.23 | −0.67 | 1750 | 0.012 | 2855 | 113 |
| Cabot BT-6 | 700 | 4.57 | 74.2 | 0.20 | 0.00 | 790 | 0.018 | 1145 | 109 |
|  | 800 | 5.21 | 84.6 | 0.23 | −0.15 | 1250 | 0.012 | 1960 | 104 |
|  | 900 | 5.39 | 87.6 | 0.22 | −0.22 | 1340 | 0.010 | 2215 | 107 |
|  | 1000 | 5.52 | 89.7 | 0.24 | −0.31 | 1770 | 0.009 | 3340 | 110 |
| Sakai BT-01 | 700 | 3.52 | 57.2 | — | −0.07 | — | — | — | — |
|  | 800 | 4.29 | 69.7 | 0.11 | −0.32 | 525 | 0.031 | 600 | 89 |
|  | 900 | 4.68 | 76.0 | 0.13 | −0.48 | 710 | 0.025 | 865 | 96 |
|  | 1000 | 5.19 | 84.3 | 0.17 | −0.70 | 980 | 0.015 | 1295 | 103 |

(1) Bismuth precursor used to coat the BaTiO₃ compositions is Bismuth 2-ethylhexanoate from Strem Chemicals.
(2) Bismuth precursor is dispersed in 1-Butanol for Cabot BT-10B and Sakai BT-01 compositions, and it is dispersed in ethanol for Cabot BT-6 composition.

the lowering and the broadening of cubic to tetragonal transition peak (Table IV). It has been reported that Bismuth does not rapidly diffuse to form a homogeneous composition with BaTiO₃, so that concentration gradients result in an average of localized Curie points broadening the dielectric anomaly, instead of a single transition peak.

Increasing the sintering temperature to 1000° C. for Bismuth-coated Cabot BT-10 BaTiO₃ composition resulted in large grain growth and an increase in the Curie temperature to 129° C. The core-shell microstructure was most likely gone by 1000° C. in the BaTiO₃ ceramics of this composition, since higher sintering temperature promoted a more homogeneous distribution of the Bismuth.

B. Densification and Dielectric Properties of Bismuth-Coated Cabot BT-10 BaTiO₃ Using Different Bismuth Sources As indicated above, the Bismuth-coated Cabot BT-10 composition exhibited better densification and dielectric properties than the other two Bismuth-coated hydrothermal BaTiO₃ powders. Next, two other Bismuth sources, i.e., Bismuth oxide (Bi₂O₃) from Aldrich and Bismuth neodecanoate from Strem Chemicals, were compared to Bismuth 2-ethylhexanoate, in coating the Cabot BT-10 BaTiO₃ powder. The solvent used to disperse the Bismuth neodecanoate and the Bismuth 2-ethylhexanoate was 1-Butanol, because Bismuth metal organics readily go into solution and remain so for an extended period of time.

Thermal gravimetric analysis shows the Bismuth-coated Cabot BT-10 BaTiO₃ powders that were coated with either of the Bismuth metal-organics to have small weight losses (5.0~8.0 wt %) and to have their weight loss finished by 500° C. Differential thermal analysis (DTA) of the Bismuth-coated BaTiO₃ compositions also showed the decomposition of the organics to be complete by 500° C.

Theoretical densities and dielectric properties of Cabot BT-10 hydrothermal BaTiO₃, coated with different Bismuth sources at 3.0 wt % equivalent Bi₂O₃ and at 5.0 wt % equivalent Bi₂O₃, are shown in Table V and Table VI (below), respectively.

Bismuth-coated Cabot BT-10 BaTiO₃ coated with Bismuth neodecanoate, sintered to high densities as low as 800°

C. for a 2-hour soak time for a 3.0 wt % $Bi_2O_3$ addition, and as low as 700° C. for the same amount of time for a 5.0 wt % $Bi_2O_3$ addition. Comparing the fracture surfaces of 3.0 wt % addition Bismuth-coated $BaTiO_3$ ceramics that were sintered at 800° C., a uniform fine-grain size microstructure (i.e., 0.2~0.4 μm) was observed for Cabot BT-10 $BaTiO_3$ coated with Bismuth neodecanoate. On the other hand, hydrothermal $BaTiO_3$ crystallites were still being sintered together for Cabot BT-10 $BaTiO_3$ powders that were either coated with Bismuth 2-ethylhexanoate or mixed with $Bi_2O_3$.

X-ray dot maps of fracture surfaces of Bismuth-coated $BaTiO_3$ ceramics showed the Bismuth ions to be dispersed throughout the microstructure for these ceramics that were sintered at 800° C. from Cabot BT-10 $BaTiO_3$ powders coated with any one of the Bismuth sources. An X-ray dot map of the fracture surface of a $BaTiO_3$ ceramic that was prepared from Cabot BT-10 $BaTiO_3$ powder, coated with Bismuth neodecanoate and sintered to 1000° C., indicates that the Bismuth had not remained evenly distributed in the microstructure after a 2-hour soak time. Furthermore, the corresponding scanning electron micrograph of the Bismuth-coated $BaTiO_3$ ceramic showed large grain growth. This grain growth was typical for $BaTiO_3$ ceramics that were sintered at 1000° C. from Bismuth-coated Cabot BT-10 $BaTiO_3$ powders. On the other hand, this large grain growth was not observed for other Bismuth-coated $BaTiO_3$ compositions (i.e., Cabot BT-6 and Sakai BT-01) unless they were sintered well above 1000° C.

TABLE V

Density and Dielectric Properties of Solution-Coated $BaTiO_3$ (3.0 wt % $Bi_2O_3$) Using Different Bismuth Sources and Sintered at Different Temperatures

| Bismuth Source | Sintering Temp. (° C.) | Bulk Density (g/cm³) | % Theoretical Density | Grain Size (μm) | Weight Change (%) | Dielectric $K_{RT}$ (1.0 kHz) | $tan\delta_{RT}$ (1.0 kHz) | $K_{max}$ (1.0 kHz) | $T_{max}$ (° C.) |
|---|---|---|---|---|---|---|---|---|---|
| Bi-2ethylhexanoate (Strem) | 700 | 3.37 | 55.3 | — | −0.24 | — | — | — | — |
| | 800 | 4.29 | 70.4 | 0.22 | −0.53 | 755 | 0.021 | 930 | 96 |
| | 900 | 5.63 | 92.3 | 0.41 | −0.84 | 2335 | 0.035 | 3340 | 112 |
| | 1000 | 5.83 | 95.6 | 2.29 | −0.90 | 2960 | 0.098 | 13,560 | 122 |
| Bi-neodecanoate (Strem) | 700 | 4.95 | 81.2 | 0.21 | −0.39 | 860 | 0.045 | 975 | 93 |
| | 800 | 5.77 | 94.6 | 0.24 | −1.62 | 2115 | 0.026 | 2875 | 98 |
| | 900 | 5.91 | 96.9 | 1.86 | −1.80 | 4370 | 0.067 | 7760 | 108 |
| | 1000 | 5.84 | 95.8 | 2.87 | −2.00 | 3490 | 0.255 | 18,080 | 110 |
| $Bi_2O_3$ (Aldrich) | 800 | 4.04 | 66.3 | 0.21 | −0.64 | — | — | — | — |
| | 900 | 5.72 | 93.8 | 0.49 | −1.13 | 2695 | 0.081 | 5730 | 117 |
| | 1000 | 5.85 | 95.9 | 2.86 | −1.17 | 2590 | 0.037 | 9570 | 121 |
| | 1100 | 5.76 | 94.5 | 6.53 | −1.70 | 2160 | 0.078 | 12,555 | 124 |

(1) $BaTiO_3$ composition used here is Cabot BT-10B.
(2) Solvent used to disperse the Bismuth precursors is 1-Butanol.

TABLE VI

Density and Dielectric Properties of Solution-Coated $BaTiO_3$ (5.0 wt % $Bi_2O_3$) Using Different Bismuth Sources and Sintered at Different Temperatures

| Bismuth Source | Sintering Temp. (° C.) | Bulk Density (g/cm³) | % Theoretical Density | Grain Size (μm) | Weight Change (%) | Dielectric $K_{RT}$ (1.0 kHz) | $tan\delta_{RT}$ (1.0 kHz) | $K_{max}$ (1.0 kHz) | $T_{max}$ (° C.) |
|---|---|---|---|---|---|---|---|---|---|
| Bi-2ethylhexanoate (Strem) | 700 | 5.19 | 84.3 | 0.23 | −0.26 | 1200 | 0.029 | 1450 | 98 |
| | 800 | 5.72 | 92.9 | 0.24 | −0.45 | 1805 | 0.030 | 2330 | 113 |
| | 900 | 5.90 | 96.3 | 0.39 | −0.50 | 2575 | 0.044 | 7910 | 127 |
| | 1000 | 5.76 | 94.5 | 3.44 | −0.52 | 3650 | 0.234 | 17,345 | 129 |
| Bi-neodecanoate (Strem) | 700 | 5.61 | 91.1 | 0.21 | −1.21 | 2715 | 0.246 | — | — |
| | 800 | 5.83 | 94.7 | 0.26 | −1.38 | 1990 | 0.053 | 2745 | 107 |
| | 900 | 5.68 | 92.3 | 1.81 | −1.44 | 5930 | 0.349 | 19,860 | 111 |
| | 1000 | 5.83 | 94.7 | — | −1.84 | 2200 | 0.318 | — | — |
| $Bi_2O_3$ (Aldrich) | 700 | 4.32 | 70.8 | — | −0.62 | — | — | — | — |
| | 800 | 5.46 | 88.7 | 0.29 | −0.95 | 1765 | 0.027 | 2290 | 112 |
| | 900 | 5.62 | 91.3 | 0.28 | −0.99 | 2010 | 0.028 | 2710 | 109 |
| | 1000 | 5.60 | 91.0 | 3.19 | −1.29 | 3470 | 0.220 | 16,255 | 123 |

(1) $BaTiO_3$ composition used here is Cabot BT-10B.
(2) Solvent used to disperse the Bismuth precursors is 1-Butanol.

Dielectric properties of Bismuth-coated BaTiO$_3$ ceramics that were sintered at 800° C. from Cabot BT-10 BaTiO$_3$ coated with Bismuth neodecanoate were better than those for BaTiO$_3$ ceramics that were sintered from Cabot BT-10 BaTiO$_3$ powders coated with the other two Bismuth sources. Bismuth-coated BaTiO$_3$ ceramics that were sintered at 800° C. from powders coated with Bismuth neodecanoate have a room temperature dielectric K value of 2115 and a tan δ value of 0.026 for 3.0 wt % equivalent Bi$_2$O$_3$ addition, and also a room temperature dielectric K value of 1990 and a tan δ value of 0.053 for 5.0 wt % equivalent Bi$_2$O$_3$ addition.

Dielectric K and tan δ vs. temperature curves for Bismuth-coated BaTiO$_3$ ceramics at 3.0 wt % addition and at 5.0 wt % addition are shown in FIGS. 2, 3 and 4, 5, 6, respectively. For Bismuth-coated BaTiO$_3$ ceramics that were sintered at 900° C. and 1000° C. from BaTiO$_3$ powders that were coated with Bi-2-ethylhexanoate, the loss (tan δ) curves show a sharp decrease at the Curie temperature and then sharply increase above the Curie temperature.

CONCLUSIONS

Bismuth-coated hydrothermal Cabot BT-10 BaTiO$_3$ densifies to high densities as low as 800° C. for a 2-hour soak for a 3.0 wt % equivalent Bi$_2$O$_3$ addition. Bismuth-coated BaTiO$_3$ ceramics densify at lower temperatures than those for non-coated BaTiO$_3$ ceramics, due to the formation of a Bismuth glassy phase surrounding the hydrothermal BaTiO$_3$ crystallites, which is similar to formation of core-shell microstructures in BaTiO$_3$-based dielectric ceramics. Indirect evidence of this formation of core-shell microstructures in Bismuth-coated BaTiO$_3$ ceramics is observed in the lowering and the broadening of the cubic to tetragonal transition peak for these BaTiO$_3$ ceramics, which indicates a distribution of local Curie temperatures resulting from localized distribution of Bismuth. Bismuth neodecanoate results in BaTiO$_3$ ceramics densifying as low as 800° C. for 3.0 wt % equivalent Bi$_2$O$_3$ addition and as low as 700° C. for 5.0 wt % equivalent Bi$_2$O$_3$ addition. Uniform fine-grain size microstructure (0.2~0.4 μm) was observed in these Bismuth-coated BaTiO$_3$ ceramic materials. Above sintering temperatures of 900° C., large grain growth occurs in BaTiO$_3$ ceramics that were sintered from Cabot BT-10 hydrothermal BaTiO$_3$ powders which were coated with Bismuth neodecanoate. Hydrothermal BaTiO$_3$ powders which were coated with Bismuth 2-ethylhexanoate also sintered to high densities, while exhibiting fine grain size microstructures.

It should be understood that the foregoing description is only illustrative of the invention. Various alternatives and modifications can be devised by those skilled in the art without departing from the invention. For instance, while the above discussion has considered the pre-fired shapes (i.e., masses) as preforms, it is to be understood that such masses can also take the form of a paste or a liquid. Accordingly, the present invention is intended to embrace all such alternatives, modifications and variances which fall within the scope of the appended claims.

What is claimed is:

1. A method for producing a BaTiO$_3$ ceramic composition, comprising the steps of:

preparing a mixture of hydrothermal BaTiO$_3$ with a Bi-containing metal-organic and a solvent;

removing solvent and adding a binder to said mixture to create a mass; and heating said mass to a temperature not exceeding about 1100° C. to sinter and densify said unitary mass to a ceramic form.

2. The method as recited in claim 1, wherein said mass is a shaped form.

3. The method as recited in claim 1, wherein said mass is a paste material.

4. The method as recited in claim 1, wherein said mass takes a substantially liquid form.

5. The method as recited in claim 1, wherein said Bi-containing metal-organic is selected from the group consisting of Bismuth neodecanoate and Bismuth 2-ethylhexanoate.

6. The method as recited in claim 1, wherein said Bi-containing metal-organic is added in sufficient quantity to add about 3% to 5% weight equivalent of Bi$_2$O$_3$ to said ceramic form, depending upon amount of excess Barium and crystallite size of hydrothermal BaTiO$_3$ powder.

7. The method as recited in claim 6, wherein said Bi-containing metal-organic is selected from the group consisting of Bismuth neodecanoate and Bismuth 2-ethylhexanoate.

8. The method as recited in claim 1, wherein said Bi-containing metal-organicis Bismuth neodecanoate, is added in sufficient quantity to add about 3% weight equivalent of Bi$_2$O$_3$ to said ceramic form and said heating step is at a temperature of about 800° C., applied between 10 seconds to two hours.

9. The method as recited in claim 1, wherein said Bi-containing metal-organic is Bismuth neodecanoate, is added in sufficient quantity to add about 5% weight equivalent of Bi$_2$O$_3$ to said ceramic form and said heating step is at a temperature of about 700° C., applied between 10 seconds to two hours.

10. The method as recited in claim 1, wherein said Bi-containing metal-organic is Bismuth 2-ethylhexanoate, is added in sufficient quantity to add about 3% weight equivalent of Bi$_2$O$_3$ to said ceramic form and said heating step is at a temperature of about 800° C., applied between 1-seconds to two hours.

11. The method as recited in claim 1, wherein said Bi-containing metal-organic is Bismuth 2-ethylhexanoate, is added in sufficient quantity to add about 5% weight equivalent of Bi$_2$O$_3$ to said ceramic form and said heating step is at a temperature of about 800° C., applied between 10 seconds to two hours.

* * * * *